3,272,819
AMINO ESTERS OF SPIRO (CYCLOPROPAN-1,9'-THIOXANTHENE)-2-CARBOXYLIC ACID
Renat Herbert Mizzoni, Long Valley, N.J., assignor to Ciba Corporation, New York, N.Y., a corporation of Delaware
No Drawing. Filed Dec. 16, 1963, Ser. No. 330,565
13 Claims. (Cl. 260—268)

The present invention relates to cyclopropane compounds, more especially to basic esters of 2,2-di-monocyclic hexacyclic aryl-cyclopropane carboxylic acids, in which one of the ortho-positions of a monocyclic hexacyclic aryl group is linked through a divalent radical with one of the ortho-positions of the other monocyclic hexacyclic aryl group, salts thereof, N-oxides thereof, salts of N-oxides thereof, and quaternary ammonium compounds thereof, as well as process for the preparation of such compounds.

A divalent radical linking together the two ortho-positions of the monocyclic hexacyclic aryl groups is above all the thio radical of the formula —S—, as well as the sulfinyl radical of the formula —SO—, the sulfonyl radical of the formula —SO$_2$—, or the oxy radical of the formula —O—. Other radicals are bivalent aliphatic radicals having from one to two carbon atoms and at most one double bond; such radicals are methylene of the formula —CH$_2$—, 1,2-ethylene of the formula —CH$_2$CH$_2$— or 1,2-ethenylene of the formula —CH=CH—.

Monocyclic hexacyclic aryl groups are above all monocyclic carbocyclic hexacyclic aryl groups, i.e. phenyl groups, as well as monocyclic hexacyclic azacyclic aryl groups, such as pyridyl groups. These groups are unsubstituted or substituted by one or more than one of the same or of different substituents attached to any of the positions available for substitution. The latter are, for example, lower alkyl, e.g. methyl, ethyl, n-propyl, isopropyl, n-butyl and the like, etherified hydroxyl, particularly lower alkoxy, e.g. methoxy, ethoxy, n-propyloxy, isopropyloxy, n-butyloxy and the like, esterified hydroxyl, particularly halogeno (representing hydroxyl esterified with a hydrohalic acid), e.g. fluoro, chloro, bromo and the like, trifluoromethyl, or any other analogous substituent.

Apart from the two monocyclic hexacyclic aryl groups and the basically esterified carboxyl group, the cyclopropane portion is unsubstituted or may be substituted, preferably by aliphatic groups, such as lower alkyl, e.g. methyl, ethyl, n-propyl, isopropyl and the like.

A basically esterified carboxyl group is more especially esterified by an N,N-disubstituted amino-lower alkyl group, in which the N,N-disubstituted amino group is separated from the carboxyl group by at least two, preferably by two to three, carbon atoms. The lower alkyl portion in an N,N-disubstituted amino-lower alkyl group esterifying the carboxyl group in the compounds of this invention is represented by lower alkylene, separating the N,N-disubstituted amino group from the carboxyl group by at least two, preferably by two to three carbon atoms, e.g. 1,2-ethylene, 1-methyl-1,2-ethylene, 2-methyl-1,2-ethylene, 1,3-propylene and the like.

In the N,N-disubstituted amino portion of an N,N-disubstituted amino-lower alkyl group, the substituents represent, for example, aliphatic radicals, such as lower alkyl, lower alkenyl and the like, cycloaliphatic radicals, such as cycloalkyl and the like, cycloaliphatic-aliphatic radicals, such as cycloalkyl-lower alkyl and the like, carbocyclic aryl, such as monocyclic carbocyclic aryl, carbocyclic aryl-aliphatic radicals, such as monocyclic carbocyclic aryl-lower alkyl and the like, or any other suitable substituents. These radicals have preferably from one to ten carbon atoms, and may be represented, for example, by lower alkyl, e.g. methyl, ethyl, propyl, isopropyl, butyl, isobutyl, secondary butyl, pentyl, neopentyl and the like, lower alkenyl, e.g. allyl, methylallyl and the like, cycloalkyl having from three to eight, preferably from five to seven, ring carbon atoms, e.g. cyclopropyl, cyclopentyl, cyclohexyl and the like, cycloalkyl-lower alkyl, in which cycloalkyl has from three to eight, preferably from five to seven, ring carbon atoms, e.g. cyclopropylmethyl, cyclopentylmethyl, cyclohexylmethyl, 2-cyclohexylethyl and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like, or any other suitable substituent. These radicals may have additional groups as substituents; free hydroxyl, lower alkoxy, e.g. methoxy, ethoxy and the like, lower alkyl-mercapto, e.g. methyl-mercapto, ethyl-mercapto, or any other suitable group may be attached to such radicals.

N,N-di-substituted amino groups are primarily represented by N,N-di-lower alkyl-amino, in which lower alkyl has preferably from one to four carbon atoms, e.g. N,N-dimethylamino, N-methyl-N-ethylamino, N,N-diethylamino, N,N-di-n-propylamino, N,N-di-isopropylamino and the like, as well as by N-cycloalkyl-N-lower alkyl-amino, in which cycloalkyl has preferably from five to seven ring carbon atoms and lower alkyl has from one to four carbon atoms, e.g. N-cyclopentyl-N-methyl-amino, N-cyclohexyl-N-methylamino, N-cyclohexyl-N-ethyl-amino and the like, N-lower alkyl-N-phenyl-lower alkyl-amino, in which lower alkyl has preferably from one to four carbon atoms, e.g. N-benzyl-N-methyl-amino, N-benzyl-N-ethyl-amino, N-methyl-N-(1-phenylethyl)-amino, N-methyl-N-(2-phenylethyl)-amino and the like, or any other N,N-disubstituted amino group. N,N-di-substituted amino groups, in which the substituents have functional groups, are, for example, N-hydroxy-lower alkyl-N-lower alkyl-amino, in which hydroxyl is separated from amino by at least two carbon atoms, e.g. N-(2-hydroxylethyl)-N-methyl-amino and the like, N,N-di-hydroxy-lower alkyl-amino, in which hydroxyl is separated from amino by at least two carbon atoms, e.g. N,N-di-(2-hydroxyethyl)-amino and the like.

In an N,N-disubstituted amino group, the substituents may also be taken together to form a divalent radical. Such N,N-di-substituted amino groups are, for example, 1-N,N-alklene imino, in which alkylene has from four to eight carbon atoms, 1-N,N-(aza-alkylene)-imino groups, in which alkylene has from four to six carbon atoms, and the two nitrogen atoms are separated by at least two carbon atoms, or 1-N,N-(oxa-alkylene)-imino and 1-N,N-(thia-alkylene)imino, in which alkylene has preferably four carbon atoms, and the nitrogen atom is separated from the ring-oxygen atom and the ring-sulfur atom, respectively, by two carbon atoms. Together with the nitrogen atom such as alkylene, aza-alkylene, oxa-alkylene or thia-alkylene radicals represent, for example, 1-N,N-alkylene-imino, in which alkylene has from four to eight carbon atoms, e.g. 1-pyrrolidino, 2-methyl-1-pyrrolidino, 1-piperidino, 2-methyl-1-piperidino, 4-methyl-1-piperidino, 3-hydroxy-1-piperidino, 3-acetoxy-1-piperidino, 3-hydroxymethyl-1-piperidino, 1-N,N-(1,6-hexylene)-imino, 1-N,N-(aza-alkylene)-imino, in which alkylene has from four to six carbon atoms and the two nitrogens are separated by at least two carbon atoms, particularly 1-piperazino groups, e.g. 1-piperazino, 4-methyl-1-piperazino, 4-ethyl-1-piperazino, 4-hydroxyethyl-1-piperazino, 4-acetoxyethyl-1-piperazino, 4-phenyl-1-piperazino, 4-(2-chloro-phenyl)-1-piperazino, 4-(2-methoxyphenyl)-1-piperazino, 4-(3-methyl-phenyl)-1-piperazino, 4-benzyl-1-piperazino and the like, 1-N,N-(3-aza-1,6-hexylene)-imino groups, e.g. 1-N,N-(3-aza-3-methyl-1,6-hexylene)-imino and the like, or 1-N,N-(4-aza-1,7-heptylene)-imino groups, e.g. 1-N,N-

(4-aza-4-methyl-1,7-heptylene)-imino and the like, 4-morpholino groups, e.g. 4-morpholino and the like, or 4-thiamorpholino groups, e.g. 4-thiamorpholino and the like.

Salts of the compounds of this invention are acid addition salts, such as the pharmaceutically acceptable, non-toxic acid addition salts, for example, those with inorganic acids, e.g. hydrochloric, hydrobromic, sulfuric, phosphoric, nitric acids and the like, or with organic acids, such as organic carboxylic acids, e.g. acetic, propionic, pivalic, glycolic, lactic, succinic, methylsuccinic, maleic, malic, tartaric, citric, benzoic, salicylic, 4-aminosalicylic, 2-phenoxy-benzoic, 2-acetoxybenzoic, nicotinic, isonicotinic acid and the like, or with organic sulfonic acids, methane sulfonic, ethane sulfonic, ethane 1,2-di-sulfonic, 2-hydroxy-ethane sulfonic, p-toluene sulfonic, naphthalene 2-sulfonic acid and the like. Acid addition salts may also serve as intermediates, for example, for the manufacture of other acid addition salts, or the purification of the free compounds, as well as for identification and characterization purposes. Salts primarily prepared for the latter are, for example, those with acidic organic nitro compounds, e.g. picric, picrolonic, flavianic acid and the like, metal complex acids, e.g. phosphotungstic, phosphomolybdic, chloroplatinic, Reinecke acid and the like, or any other equivalent acids.

Also included within the scope of this present invention are the N-oxides of the compounds of this invention, as well as acid addition salts of such N-oxides.

Quaternary ammonium derivatives of the compounds of this invention are those formed with the reactive esters of alcohols and strong acids. They are represented primarily by lower alkyl, e.g. methyl, ethyl, n-propyl, isopropyl and the like, or phenyl-lower alkyl, e.g. benzyl, 1-phenylethyl, 2-phenylethyl and the like, quaternary ammonium salts, such as halides, e.g. chloride, bromide, iodide and the like, sulfates, or sulfonates, such as lower alkane sulfonates, e.g. methane sulfonate, ethane sulfonate and the like, hydroxy-lower alkane sulfonates, e.g. methyl 2-hydroxyethane sulfonate and the like, monocyclic carbocyclic aryl sulfonates, e.g. p-toluene sulfonate and the like, or any other reactive ester of an alcohol. Also included as quaternary ammonium compounds are the corresponding quaternary ammonium hydroxides, and the salts of such hydroxides with acids, other than hydrohalic, sulfuric or sulfonic acids.

The compounds of this invention may be in the form of mixtures of isomers, such as racemates, or of the single isomers, such as the optically active antipodes.

The compounds of this invention are more especially those of the formula

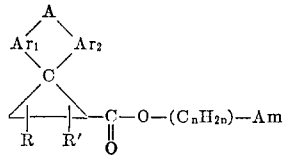

in which each of the groups $Ar_1$ and $Ar_2$ is a monocyclic hexacyclic 1,2-arylene radical, A represents a divalent radical, especially thio of the formula —S—, as well as sulfinyl of the formula —SO—, sulfonyl of the formula —$SO_2$—, oxy of the formula —O— or a divalent aliphatic radical having from one to two carbon atoms and at most one double bond, each of the groups R and R' is hydrogen or an aliphatic radical, the group of the formula

is lower alkylene separating the group Am from the oxygen atom by at least two carbon atoms, and Am is N,N-disubstituted amino, salts thereof, N-oxides thereof, salts of N-oxides thereof, or quaternary ammonium compounds thereof.

The compounds of this invention have antifibrillatory and antiarrhythmic effects and are useful in the treatment of heart fibrillations and arrhythmias, such as those of neurogenic or cardiogenic, auricular or ventricular nature.

It has also been found, that compounds of this invention cause a decrease of the gastric secretion of hydrochloric acid, and are, therefore, useful in the management and treatment of gastric irritation or gastric ulcers by reducing the amount of free hydrochloric acid in the stomach, or as research tools in the study of the mechanism of gastric secretion of hydrochloric acid.

Particularly useful are the compounds of the formula

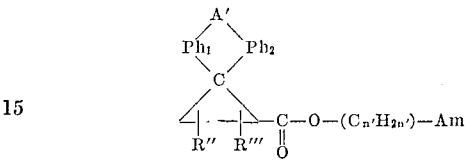

in which each of the groups $Ph_1$ and $Ph_2$ is 1,2-phenylene, (lower alkyl)-1,2-phenylene, (lower alkoxy)-1,2-phenylene, (halogeno)-1,2-phenylene or (trifluoromethyl)-1,2-phenylene, A' is thio, sulfonyl, oxy, or 1,2-ethylene, each of the groups R" and R'" is hydrogen or lower alkyl, the group of the formula —($C_{n'}H_{2n'}$)— is lower alkylene having from two to three carbon atoms and separating the group Am' from the oxygen atom by two to three carbon atoms, and Am' is N,N-di-lower alkyl-amino, N,N-alkylene-imino, in which alkylene has from four to six carbon atoms, 4-lower alkyl-1-piperazine, 4-phenyl-1-piperazino or 4-morpholino, or acid addition salts, particularly pharmaceutically acceptable acid addition salts, thereof. These compounds are above all represented by those of the formula

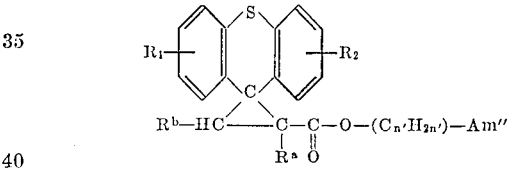

in which the group of the formula —($C_{n'}H_{2n'}$)— has the previously given meaning, separating the group Am" from the oxygen atom by two to three carbon atoms, each of the groups $R_1$ and $R_2$ is hydrogen, lower alkyl, lower alkoxy or halogeno, each of the groups $R^a$ and $R^b$ is hydrogen or methyl, and Am" is N,N-di-lower alkylamino, or acid addition salts, particularly pharmaceutically acceptable acid addition salts, thereof.

The new compounds of this invention can be used in the form of compositions suitable for renteral or parenteral administration which consist essentially of a pharmacologically effective amount of one of the new compounds in admixture with a pharmaceutically acceptable, organic or inorganic, solid or liquid carrier. For making up the preparations, there are used carrier substances, such as water, gelatine, lactose, glucose, starches, stearic acid, magnesium stearate, calcium stearate, stearyl alcohol, talc, vegetable oils, benzyl alcohols, gums, acacia, propylene glycol, polyalkylene glycols, or any other known carrier materials. The compositions may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. The pharmaceutical compositions are prepared according to the standard methods known in the art; they may also contain, in combination, other useful substances.

The compounds of this invention are prepared, for example, by reacting a di-monocyclic hexacyclic aryl-diazomethane compound, in which one of the ortho-positions of a monocyclic hexacyclic aryl group is linked through a divalent radical with one of the ortho-positions of the other monocyclic hexacyclic aryl group, with a basic ester of an acrylic acid, and, if desired, converting a resulting salt into the free compound or another salt, and/or, if desired, converting a resulting compound into an N-oxide or a quaternary ammonium compound thereof, and/or, if desired, converting a resulting compound or an N-oxide into a salt thereof, and/or, if desired, converting a resulting quaternary ammonium compound into another quaternary ammonium compound, and/or, if desired, separating a mixture of isomers into the single isomers.

The reaction of the diazo compound with the basic ester of the acrylic acid is carried out in the presence of a suitable diluent, e.g. benzene and the like, and usually takes place at room temperature or, if necessary, while cooling or at an elevated temperature.

The starting material used in the above procedure is prepared according to known methods. For example, a di-monocyclic hexacyclic aryl-ketone or a di-monocyclic hexacyclic aryl-thioketone, in which one of the ortho-positions of a monocyclic hexacyclic aryl group is linked through a divalent radical with one of the ortho-positions of the other monocyclic hexacyclic aryl group, when treated with hydrazine, for example, in the form of its hydrate, preferably in the presence of a solvent, e.g. ethanol, benzene and the like, or solvent mixture, for example, a mixture of ethanol and benzene and the like, and at an elevated temperature, yields a di-monocyclic hexacyclic aryl-methylene-hydrazine, in which one of the ortho-positions of a monocyclic hexacyclic aryl group is linked through a divalent radical with one of the ortho-positions of the other monocyclic hexacyclic aryl group, which is then converted into the desired di-monocyclic hexacyclic aryl-diazomethane compound by oxidation, for example, with mercuric oxide, which is used in the presence of a base, e.g. potassium hydroxide and the like, preferably an ethanolic mixture of the base and anhydrous sodium sulfate, and in the presence of an additional diluent, e.g. diethyl ether and the like.

The compounds of the present invention are also prepared by converting in a 2,2-di-monocyclic hexacyclic aryl-cyclopropane carboxylic acid, in which one of the ortho-positions of a monocyclic hexacyclic aryl group is linked through a bivalent radical with one of the ortho-positions of the other monocyclic hexacyclic aryl group, or a reactive functionally converted carboxylic acid derivative thereof, the carboxyl group or the reactive functionally converted carboxyl group into a basic esterified carboxyl group, and, if desired, carrying out the optional steps.

The conversion of a carboxyl group or a reactive functionally converted carboxyl group into a basic esterified carboxyl group is carried out according to known methods. For example, a starting material having a free carboxyl group, preferably a salt thereof, may be reacted with a reactive ester of a basic alcohol, especially an N,N-disubstituted amino-lower alkanol of the formula $$X\text{---}(C_nH_{2n})\text{---}Am$$

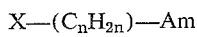

in which Am and the group of the formula —$(C_nH_{2n})$— have the previously-given meaning, and X is a reactive esterified hydroxyl group, or a salt thereof.

A salt of the starting material having a free carboxyl group is a metal salt, particularly an alkali metal, e.g. lithium, sodium, potassium and the like, salt thereof. Formation of such salt is achieved, for example, by reacting the starting material with a metal compound-forming reagent, such as an alkali metal hydride or amide, e.g. lithium hydride, sodium hydride, sodium amide, potassium amide and the like, an alkali metal lower alkoxide, e.g. lithium, sodium or potassium methoxide, ethoxide, tertiary butoxide and the like, an alkali metal compound of a hydrocarbon, e.g. butyl lithium, phenyl lithium, phenyl sodium and the like, a metal carbonate, e.g. lithium, sodium or potassium carbonate or hydrogen carbonate and the like, a metal hydroxide, e.g. sodium hydroxide, potassium hydroxide, calcium hydroxide and the like, or any other analogous reagent. The preparation of the metal compounds is carried out in the presence of a solvent selected on the basis of the physico-chemical charateristics, e.g. solubility and the like, of the starting material, as well as the reactivity of the metal compound-forming reagent; suitable solvents are, for example, hexane, benzene, toluene, xylene, diethyl ether, p-dioxane, tetrahydrofuran, diethyleneglycol dimethylether, N,N - dimethylformamide and the like, or any other proper solvent, such as a lower alkanol, e.g. methanol, ethanol and the like, or solvent mixture.

The reactive ester of the previously-described reagent is above all an ester with a strong mineral acid, such as a hydrohalic acid, e.g. hydrochloric, hydrobromic acid and the like, and the group X represents primarily halogeno, e.g. chloro, bromo and the like; other suitable acids furnishing a reactive esterified hydroxyl group are, for example, sulfuric acid, or strong organic sulfonic acids, such as lower alkane sulfonic acids, e.g. methane sulfonic, ethane sulfonic acid and the like, or monocyclic carbocyclic arylsulfonic acids, e.g. p-toluene sulfonic acid and the like, and group X may, therefore, also be lower alkyl-sulfonyloxy, e.g. methylsulfonyloxy, ethylsulfonyloxy and the like, or monocyclic carbocyclic aryl-sulfonyloxy, e.g. 4-methylphenyl-sulfonyloxy and the like. The preferred reactive ester reagents used in the above reaction are those having the formula Hal—$(C_nH_{2n})$—Am, in which Am, Hal and the group of the formula —$(C_nH_{2n})$— have the previously-given meaning, or salts thereof. Salts of such reagents are acid addition salts, such as those with hydrohalic acids and the like.

The reaction of the starting material, particularly a metal compound thereof, with the reactive ester reagent is carried out in a suitable diluent, for example, the solvent used for the preparation of the salt, which, however, may be replaced by or diluted with another solvent. If necessary, it is performed while cooling or at an elevated temperature, and/or, in the atmosphere of an inert gas, e.g. nitrogen. If desired, the formation of the metal salt of the starting material may also be carried out in situ, i.e. the starting material having a carboxyl group and the reagent having a reactive esterified hydroxyl group or a salt thereof are reacted together in the presence of a metal salt-forming reagent, or of any other suitable base.

A reactive, functionally converted carboxyl group capable of being converted into a basic esterified carboxyl group, is, for example, a carboxy-halide, particularly chloride and the like, or an esterified carboxyl group other than a basic esterified carboxyl group. A starting material having such reactive functionally converted carboxyl group is reacted with a basic alcohol, particularly with an N,N-disubstituted amino-lower alkanol of the formula Ho—$(C_nH_{2n})$—Am, in which Am and the group of the formula —$(C_nH_{2n})$— have the previously-given meaning, or a salt thereof, if necessary, in the presence of a suitable reagent. If desired, the starting material having a carboxy-halide group is reacted with the basic alcohol or an acid addition salt thereof in the presence of a base, such as an alkali metal carbonate and the like, or with an alkali metal compound of the basic alcohol, which may also be formed in situ. A starting material having an esterified carboxyl group is reacted with the basic alcohol in the presence of a transesterification reagent, such as the corresponding metal, e.g. alkali metal, alkaline earth metal, aluminum and the like, N,N-disubstituted amino-lower alkoxide, an alkali metal cyanide, a quaternary ammonium hydroxide, e.g. N-benzyl-N,N,N-trimethylammonium hydroxide and the like, or any other suitable reagent.

The starting materials used in the above modification of the procedure of this invention are prepared by reacting a dimonocyclic hexacyclic aryl-diazomethane compound, in which one of the ortho-positions of a monocyclic hexacyclic aryl group is linked through a bivalent radical with one of the ortho-positions of the other monocyclic hexacyclic aryl group, with an acrylic acid or a reactive functional derivative other than a basic ester thereof, and, if desired, converting in a resulting 2,2-di-monocyclic carbocyclic aryl-cyclopropane carboxylic acid, in which one of the ortho-positions of a monocyclic hexacyclic aryl groups is linked through a bivalent radical with one of the ortho-positions of the other monocyclic hexacyclic aryl group, or a reactive functional derivative thereof the carboxyl group into a reactive functionally converted carboxyl group or a reactive functionally converted carboxyl group into another reactive functionally converted carboxyl group. The reaction of the diazo-compound used as the intermediate with the acrylic acid compound is carried out as previously described. In a resulting starting material having a free carboxyl group, such group may be converted into a carboxy-halide group (for example, by treatment with a thionyl halide, e.g. thionyl chloride and the like, a phosphorus halide, e.g. phosphorus tribromide and the like), or into an esterified carboxyl group, for example, by esterification with an alcohol other than a basic alcohol, such as a lower alkanol, in the presence of an esterification reagent. A starting material having a functionally converted carboxyl group, may be converted into a starting material having another functionally converted carboxyl group according to known methods, for example, by reacting a starting material having a carboxy-halide group with an alcohol other than a basic alcohol, or by transesterifying a starting material having an esterified carboxyl group with an alcohol other than a basic alcohol in the presence of a transesterifying reagent.

In a resulting compound, the basic esterified carboxyl group may be converted into another basic esterified carboxyl group by transesterification, for example, by treatment with a basic alcohol, such as an alcohol of the formula HO—$(C_nH_{2n})$—Am, in which Am and the group of the formula —$(C_nH_{2n})$— have the previously-given meaning, in the presence of a transesterification reagent, for example, the corresponding metal, e.g. alkali metal, alkaline earth metal or aluminum alcoholate, an alkali metal cyanide, benzyl trimethyl ammonium hydroxide and the like.

A resulting salt may be converted into the free compound, for example, by treatment with an alkaline reagent, such as a metal hydroxide, e.g. lithium hydroxide, sodium hydroxide, potassium hydroxide, calcium hydroxide and the like, metal carbonate, e.g. sodium, potassium or calcium carbonate or hydrogen carbonate and the like, ammonia, or any other appropriate alkaline reagent, as well as a suitable hydroxyl ion exchange resin.

A resulting salt may be converted into another salt according to known methods; for example, the salt with an inorganic acid may be reacted with a metal salt, e.g. sodium, barium, silver and the like, salt of an acid in the presence of a diluent, in which a resulting inorganic compound is insoluble and is thus removed from the reaction medium. Conversion of one salt into another is also achieved by treatment with a suitable anion exchange preparation.

A resulting free compound may be converted into an acid addition salt by reacting it with an acid, such as one of those mentioned above. The salt-forming reaction may be carried out, for example, by treating a solution of the free compound in the presence of a solvent or solvent mixture, with an appropriate acid or a solution thereof, or an anion exchange preparation, and isolating the desired salt, which may also be obtained in the form of hydrates thereof or may contain solvent of recrystallization.

N-oxides of the compounds of this invention are prepared according to known methods, for example, by treating a resulting compound, preferably in an inert solvent, with an N-oxidizing reagent, such as, for example, ozone, hydrogen peroxide, inorganic peracids, e.g. persulfuric acid and the like, organic persulfonic acids, e.g. p-toluene persulfonic acid and the like, or primarily organic percarboxylic acids, e.g. peracetic acid, perbenzoic acid, monoperphthalic acid and the like. The N-oxides may be obtained in the form of the free compounds or the acid addition salts thereof; a free N-oxide compound may be converted into its acid addition salt, or an N-oxide salt may be converted into the free N-oxide base according to the previously-described procedures.

Quaternary ammonium derivatives of the compounds of this invention are obtained, for example, by reacting the resulting compound with a reactive ester of alcohol, such as a lower alkyl halide, e.g. methyl, ethyl, n-propyl or isopropyl chloride, bromide or iodide and the like, a di-lower alkyl sulfate, e.g. dimethyl sulfate, diethyl sulfate and the like, a lower alkyl lower alkane sulfonate, e.g. methyl or ethyl methane sulfonate or methane sulfonate and the like, a lower alkyl carbocyclic aryl sulfonate, e.g. methyl p-toluene sulfonate and the like, a phenyl-lower alkyl halide, e.g. benzyl, 1-phenylethyl or 2-phenylethyl chloride or bromide and the like, or any other analogous reactive ester reagent. The quaternizing reaction may be performed in the absence or presence of a solvent, under cooling, at room temperature or at an elevated temperature, at atmospheric pressure or in a closed vessel under pressure, and, if desired, in the atmosphere of an inert gas, e.g. nitrogen.

A resulting quaternary ammonium compound may be converted into another quaternary ammonium compound, such as a quaternary ammonium hydroxide, for example, by reacting a quaternary ammonium halide with silver oxide, or a quaternary ammonium sulfate with barium hydroxide, by treating a quaternary ammonium salt with a hydroxyl ion exchange resin, by electrodialysis or any other suitable means. From a resulting quaternary ammonium hydroxide there may be obtained quaternary ammonium salts by reacting the quaternary ammonium hydroxide compound with an acid, for example, one of those used for the preparation of acid addition salts. A quaternary ammonium compound may also be converted directly into another quaternary ammonium salt without the formation of an intermediate quaternary ammonium hydroxide. For example, a quaternary ammonium iodide may be reacted with freshly prepared silver chloride, or with hydrochloric acid in anhydrous methanol; a quaternary ammonium compound may also be converted into another quaternary ammonium compound by treatment with a suitable anion exchange preparation.

A resulting mixture of isometric compounds may be separated into the single isomers according to known methods. For example, a racemate may be resolved into the optically active forms, the levo-rotatory $l$-form and the dextro $d$-form according to known resolution methods. For example, to the solution of the free base of a racemate (a $d$, $l$-compound) in a suitable solvent or solvent mixture is added one of the optically active forms of an acid, containing an asymmetric carbon atom, or a solution thereof. Especially useful as optically active forms of salt-forming acids, having the asymmetric carbon atom are the $d$-tartaric acid (L-tartaric acid) and the $l$-tartaric acid (D-tartaric acid); the optically active forms of dibenzoyl-tartaric, di-p-toluyl-tartaric, malic, mandelic, 10-camphor sulfonic acid, quinic acid and the like, may also be used. Salts formed with one of the optically active forms of the acid may then be separated on the basis of physio-chemical differences, e.g. different solubilities and the like. The free and optically active base may be obtained from the resulting salt according to the methods described above, and an optically active base may be converted into its acid addition salt, an N-oxide thereof or a quaternary ammonium compound thereof as described hereinbefore.

The invention also comprises any modification of the process wherein a compound obtainable as an intermediate at any stage of the process is used as starting material and the remaining step(s) of the process is(are) carried out. It also includes any new intermediates, which may be formed in one of the procedures outlined hereinbefore.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a solution of 3.5 g. of 9-diazo-thioxanthene in 35 ml. of benzene is aded 2.7 g. of 2-N,N-diethylamino-ethyl 2-methylacrylate. After standing for two hours, the solution is taken to dryness under reduced pressure, and the residue is dissolved in diethyl ether. The solution is treated with anhydrous hydrogen chloride gas to yield the 2-N,N-diethylaminoethyl 2-methyl spiro[cyclopropan - 1,9' - thioxanthene]-2-carboxylate hydrochloride of the formula

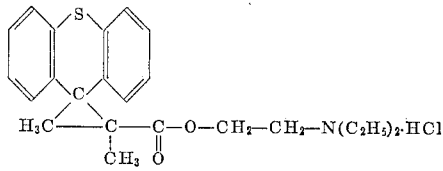

which is collected and is recrystallized from a mixture of ethyl acetate and diethyl ether, M.P. 150–154°; yield: 3.8 g.

The starting material used in the above procedure is prepared as follows: A mixture of 58.5 g. of thioxanthen-9-one and 100 g. of oxalyl chloride is refluxed for twenty hours and is then concentrated to dryness. The residue is dissolved in 500 ml. of benzene, and the solution is treated with 100 g. of thiolacetic acid of the formula $CH_3-CO-SH$. The mixture is stirred and refluxed for five hours; the precipitate is filtered off and combined with a second crop obtained by concentrating the filtrate to dryness. The resulting thioxanthen-9-thione is purified by recrystallization from a mixture of benzene and cyclohexane, M.P. 179°; yield: 52.7 g.

A suspension of 52.7 g. of thioxanthen-9-thione in 100 ml. of benzene and 100 ml. of anhydrous ethanol is heated to reflux while stirring, and is then treated with a solution of 11.6 g. of hydrazine hydrate (100 percent) in 263 ml. of ethanol. A total of 11.6 ml. of water is added and the mixture is refluxed for six hours. The desired 9-hydrazono-thioxanthene precipitates upon cooling and is filtered off; it melts at 80–83° after recrystallization from isopropanol and decolorization with a charcoal preparation; yield: 26.7 g.

A suspension of 26.7 g. of 9-hydrazono-thioxanthene, 112 g. of mercuric oxide and 27.6 g. of sodium sulfate in 500 ml. of anhydrous diethyl ether is treated with 6.5 ml. of a saturated solution of potassium hydroxide in methanol. After stirring at room temperature for six hours, the reaction mixture is filtered, the solid material is washed with diethyl ether, and the combined filtrates are concentrated under reduced pressure without heating. The desired 9-diazo-thioxanthene melts at 96° after recrystallization from petroleum ether; yield: 23.3 g.

*Example 2*

To a solution of 8.7 g. of 9-diazo-thioxanthene in 78 ml. of benzene is added 10.2 g. of 2-(4-phenyl-1-piperazino)-ethyl 2-methyl-acrylate. After standing for three days at room temperature, the reaction mixture is taken to dryness, and the residue is dissolved in diethyl ether and a small amount of ethanol. The resulting solution is treated with anhydrous hydrogen chloride gas; the desired 2-(4-phenyl-1-piperazino)-ethyl 2-methyl spiro[cyclopropan - 1,9' - thioxanthene]-2-carboxylate hydrochloride for the formula

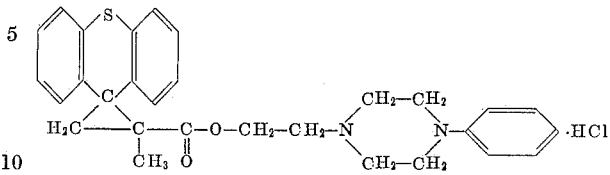

precipitates, is filtered off and recrystallized from a mixture of ethanol, ethyl acetate and diethyl ether. It melts as the hemihydrate at 149°; yield: 13.5 g.

The starting material used in the above procedure is prepared as follows: A solution of 18.6 g. of 1-(2-hydroxyethyl)-4-phenyl-piperazine in 250 ml. of chloroform is treated dropwise with a solution of 10.6 g. of 2-methyl-acrylic acid chloride in 70 ml. of chloroform. After stirring at room temperature for three hours, the solution is chilled and filtered, the filtrate is taken to dryness and the residue is dissolved in water. The solution is made slightly basic with an aqueous solution of sodium hydroxide and is extratced with methylene chloride; the organic phase is dried over magnesium sulfate and concentrated to dryness to yield 10.2 g. of 2-(4-phenyl-1-piperazino)-ethyl 2-methyl-acrylate, which is used without further purification.

*Example 3*

A solution of 7.65 g. of 9-diazo-thioxanthene in 60 ml. of benzene is treated with 5.4 g. of 2-N,N-dimethylamino-ethyl 2-methyl-acrylate. The reaction mixture is allowed to stand for three days at room temperature and is then concentrated to dryness. The residue is dissolved in diethyl ether, and the solution is treated with anhydrous hydrogen chloride gas; the solvent is decanted from the oily residue which crystallizes upon boiling with ethyl acetate. The desired 2-N,N-dimethylaminoethyl 2-methyl spiro[cyclopropan-1,9'-thioxanthene] - 2 - carboxylate hydrochloride of the formula

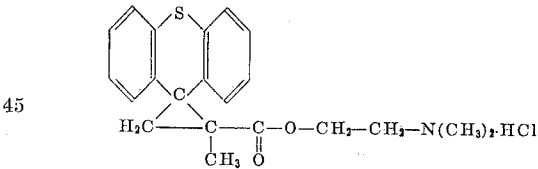

is recrystallized from a mixture of ethanol and ethyl acetate and melts as the monohydrate at 182–183.5°; yield: 8.7 g.

*Example 4*

A solution of 9.0 g. of 2-N,N-diethylaminoethyl 2-methyl spiro[cyclopropan-1,9'-thioxanthene]-2-carboxylate (prepared from the hydrochloride salt of Example 1 by rendering slightly basic an aqueous solution of the latter with an aqueous solution of sodium hydroxide and extracting the free compound with methylene chloride) and 2.1 ml. of methyl iodide in 100 ml. of anhydrous ethanol is refluxed for three hours and is then concentrated to dryness. The residue is triturated with ethyl acetate and diethyl ether, and is then recrystallized from a mixture of ethanol, ethyl acetate and diethyl ether. The desired 2-N,N-diethylaminoethyl 2-methyl spiro [cyclopropan-1,9'-thioxanthene] - 2 - carboxylate methiodide of the formula

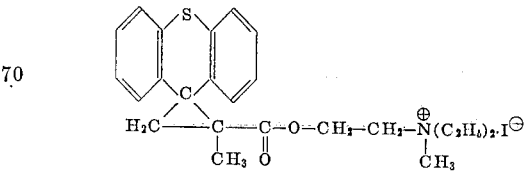

which melts at 110° after a further recrystallization from a mixture of ethanol and ethyl acetate and is obtained as the hemihydrate; yield: 7.7 g.

Example 5

A solution of 5.0 g. of 2-(4-phenyl-1-piperazino)-ethyl 2-methyl spiro[cyclopropan-1,9'-thioxanthene]-2-carboxylate (prepared from the hydrochloride salt of Example 2 by rendering slightly basic an aqueous solution of the latter with an aqueous solution of sodium hydroxide and extracting the free compounds with methylene chloride) and 3.5 g. of methyl iodide in 100 ml. of anhydrous ethanol is refluxed for seven hours. The desired 2-(4-phenyl-1-piperazino)-ethyl 2-methyl spiro[cyclopropan-1,9'-thioxanthene]-2-carboxylate methiodide of the formula

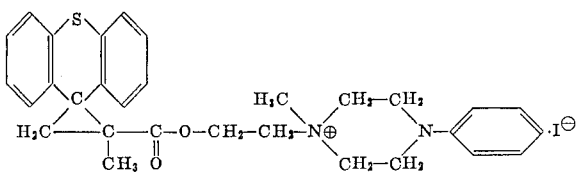

is isolated by removing the solvent and is recrystallized from a mixture of methanol and isopropanol; it melts at 120–125° as the hemihydrate; yield: 4.0 g.

Example 6

The following compounds are prepared according to the previously described method by selecting the appropriate intermediates for the manufacture of the starting materials, which are obtained according to the method previously described and illustrated:

What is claimed is:

1. A member selected from the group consisting of a compound having the formula

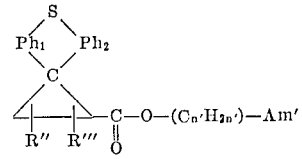

in which each of the groups $Ph_1$ and $Ph_2$ is a member selected from the group consisting of 1,2-phenylene, (lower alkyl)-1,2-phenylene, (lower alkoxy)-1,2-phenylene, (halogeno)-1,2-phenylene, and (trifluoromethyl)-1,2-phenylene, each of the groups R'' and R''' is a member selected from the group consisting of hydrogen and lower alkyl, the group of the formula —$(C_{n'}H_{2n'})$— is lower alkylene having from two to three carbon atoms and separating the group Am' from the oxygen atom by two to three carbon atoms, and Am' is a member selected from the group consisting of 1-N,N-lower alkyleneimino with four to six ring-carbon atoms, 4-lower alkyl-1-piperazino, 4-phenyl-1-piperazino and 4-morpholino, an acid addition salt, a quaternary lower alkyl-ammonium salt and a quaternary phenyl-lower alkyl-ammonium salt thereof.

2. A compound of the formula

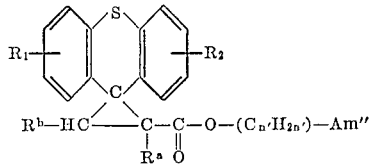

in which each of the groups $R_1$ and $R_2$ is a member se-

| Diazo-Starting Material | Basic Ester of Acrylic Acid | Cyclopropane Product |
|---|---|---|
| 9-diazo-thioxanthene | 3-N,N-dimethylaminopropyl acrylate | 3-N,N-dimethylaminopropyl spiro[cyclopropan-1,9'-thioxanthene]-2-carboxylate. |
| Do | 2-(1-pyrrolidino)-ethyl 2-methyl-acrylate | 2-(1-pyrrolidino)-ethyl 2-methyl spiro[cyclopropan-1,9'-thioxanthene]-2-carboxylate. |
| Do | 2-(1-piperidino)-ethyl 2-methyl-acrylate | 2-(1-piperidino)-ethyl 2-methyl spiro[cyclopropan-1,9'-thioxanthene]-2-carboxylate. |
| Do | 2-(4-morpholino)-ethyl 2,3-dimethyl-acrylate | 2-(4-morpholino)-ethyl 2,3-dimethyl spiro[cyclopropan-1,9'-thioxanthene-2-carboxylate. |
| Do | N,N-dimethylaminoisopropyl 3-methyl-acrylate | N,N-dimethylaminoisopropyl 3-methyl spiro[cyclopropan-1,9'-thioxanthene]-2-carboxylate. |
| Do | 2-(4-methyl-1-piperazino)-ethyl 2-methyl-acrylate | 2-(4-methyl-1-piperazino)-ethyl 2-methyl spiro[cyclopropan-1,9'-thioxanthene]-2-carboxylate. |
| 2-chloro-9-diazo-thioxanthene | 2-N,N-diethylaminoethyl 2-methyl-acrylate | 2-N,N-diethylaminoethyl 2-methyl-2'-chloro-2-methyl spiro[cyclopropan-1,9'-thioxanthene]-carboxylate. |
| 9-diazo-2-trifluoromethylthioxanthene | do | 2-N,N-diethylaminoethyl 2-methyl-2'-trifluoromethyl spiro[cyclopropan-1,9'-thioxanthene]-2-carboxylate. |
| 9-diazo-4-methylthioxanthene | do | 2-N,N-diethylaminoethyl 2,4'-dimethyl spiro[cyclopropan-1,9'-thioxanthene]-2-carboxylate. |
| 9-diazo-2,7-dimethylthioxanthene | do | 2-N,N-diethylaminoethyl 2,2',7'-trimethyl spiro[cyclopropan-1,9'-thioxanthene]-2-carboxylate. |
| 9-diazo-xanthene | do | 2-N,N-diethylaminoethyl 2-methyl spiro[cyclopropan-1,9'-xanthene]-2-carboxylate. |
| 2-bromo-9-diazo-xanthene | 2-(1-piperidino)-ethyl 2-methyl-acrylate | 2-(1-piperidino)-ethyl 2'-bromo-2-methyl spiro[cyclopropan-1,9'-xanthene]-2-carboxylate. |
| 9-diazo-3-methoxy-xanthene | 2-N,N-diethylaminoethyl 2-methyl-acrylate | 2-N,N-diethylaminoethyl 3'-methoxy-2-methyl spiro[cyclopropan-1,9'-xanthene]-2-carboxylate. |
| 9-diazo-thioxanthen-10-oxide | do | 2-N,N-diethylaminoethyl 2-methyl spiro[cyclopropan-1,9'-thioxanthen-10-oxide]-2-carboxylate. |
| 9-diazo-thioxanthen-10,10-dioxide | do | 2-N,N-diethylaminoethyl 2-methyl spiro[cyclopropan-1,9'-thioxanthen-10,10-dioxide]-2-carboxylate. |
| 9-diazo-9,10-dihydro-anthracene | do | 2-N,N-diethylaminoethyl 2-methyl spiro[cyclopropan-1,9'-(9,10-dihydro-anthracene)]-2-carboxylate. |
| 5-diazo-10,11-dihydro-5H-dibenzo[a,d]cycloheptene | do | 2-N,N-diethylaminoethyl 2-methyl spiro[cyclopropan-1,5'-(10,11-dihydro-5H-dibenzo[a,d]cycloheptene)]-2-carboxylate. | lected from the group consisting of hydrogen, lower alkyl, lower alkoxy and halogeno, each of the groups $R^a$ and $R^b$ is a member selected from the group consisting of hydrogen and methyl, the group of the formula $-(C_{n'}H_{2n'})-$ is lower alkylene having from two to three carbon atoms and separating the group Am'' from the oxygen atom by two to three carbon atoms, and Am'' is N,N-di-lower alkyl-amino.

3. An acid addition salt of a compound of the formula

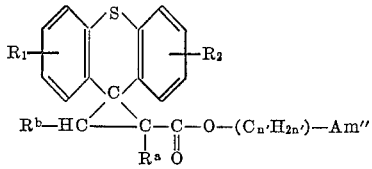

in which each of the groups $R_1$ and $R_2$ is a member selected from the group consisting of hydrogen, lower alkyl, lower alkoxy and halogeno, each of the groups $R^a$ and $R^b$ is a member selected from the group consisting of hydrogen and methyl, the group of the formula $-(C_{n'}H_{2n'})-$ is lower alkylene having from two to three carbon atoms and separating the group Am'' from the oxygen atom by two to three carbon atoms, and Am'' is N,N-di-lower alkyl-amino.

4. 2-N,N-diethylaminoethyl 2-methyl spiro[cyclopropan-1,9'-thioxanthene]-2-carboxylate.

5. An acid addition salt of 2-N,N-diethylaminoethyl 2-methyl spiro[cyclopropan-1,9'-thioxanthene]-2-carboxylate.

6. 2-N,N-diethylaminoethyl 2-methyl spiro[cyclopropan-1,9'-thioxanthene]-2-carboxylate hydrochloride.

7. A lower alkyl quaternary ammonium halide of 2-N,N-diethylaminoethyl 2-methyl spiro[cyclopropan-1,9'-thioxanthene]-2-carboxylate.

8. 2-N,N-diethylaminoethyl 2-methyl spiro[cyclopropan-1,9'-thioxanthene]-2-carboxylate methiodide.

9. 2-N,N-dimethylaminoethyl 2-methyl spiro[cyclopropan-1,9'-thioxanthene]-2-carboxylate.

10. An acid addition salt of 2-N,N-dimethylaminoethyl 2-methyl spiro[cyclopropan-1,9'-thioxanthene]-2-carboxylate.

11. 2-(4-phenyl-1-piperazino)-ethyl 2-methyl spiro[cyclopropan-1,9'-thioxanthene]-2-carboxylate.

12. An acid addition salt of 2-(4-phenyl-1-piperazino)-ethyl 2-methyl spiro[cyclopropan-1,9'-thioxanthene]-2-carboxylate.

13. A lower alkyl quaternary ammonium halide of 2-(4-phenyl-1-piperazino)-ethyl 2-methyl spiro[cyclopropan-1,9'-thioxanthene]-2-carboxylate.

References Cited by the Examiner

Monroe et al., Journ. Medicinal Chemistry, vol. 6, pages 255–261, May 1963.

Sigg et al., Journ. Pharm. and Exptl. Therapeutics, vol. 142, No. 1, pages 13 to 20, September 1963.

Villani et al., Journ. of Med. and Pharm. Chemistry, vol. 5, No. 2, pages 373 to 383, 1962.

HENRY R. JILES, *Primary Examiner.*

JAMES W. ADAM, JR., *Assistant Examiner.*